(12) United States Patent
Ikuta et al.

(10) Patent No.: US 11,639,704 B2
(45) Date of Patent: *May 2, 2023

(54) CONTROLLER AND CONTROL METHOD FOR INTERNAL COMBUSTION ENGINE

(71) Applicant: TOYOTA JIDOSHA KABUSHIKI KAISHA, Toyota (JP)

(72) Inventors: Eiji Ikuta, Oobu (JP); Yuki Nose, Kasugai (JP); Yuto Ikeda, Toyota (JP); Keiichi Myojo, Okazaki (JP); Yoshiyuki Shogenji, Toyota (JP); Hirokazu Ando, Kariya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 141 days.

This patent is subject to a terminal disclaimer.

(21) Appl. No.: 17/113,244

(22) Filed: Dec. 7, 2020

(65) Prior Publication Data

US 2021/0088008 A1 Mar. 25, 2021

Related U.S. Application Data

(63) Continuation of application No. 16/504,468, filed on Jul. 8, 2019, now Pat. No. 10,890,143.

(30) Foreign Application Priority Data

Aug. 7, 2018 (JP) .............................. JP2018-148059

(51) Int. Cl.
*F02M 26/35* (2016.01)
*F02D 41/02* (2006.01)
(Continued)

(52) U.S. Cl.
CPC .......... *F02M 26/35* (2016.02); *F01N 3/0253* (2013.01); *F01N 3/035* (2013.01); *F01N 3/2033* (2013.01); *F02D 41/025* (2013.01); *F02D 41/029* (2013.01)

(58) Field of Classification Search
CPC .... F01N 3/0253; F01N 3/2033; F02D 41/025; F02D 41/029; F02M 26/35
(Continued)

(56) References Cited

U.S. PATENT DOCUMENTS

2011/0072802 A1 3/2011 Bidner et al.
2014/0041362 A1 2/2014 Ulrey et al.
(Continued)

FOREIGN PATENT DOCUMENTS

DE  102017125088 A1  5/2018
JP  2007146774 A * 6/2007 ............. F02M 26/06
(Continued)

OTHER PUBLICATIONS

Jun. 29, 2020 Office Action issued in U.S. Appl. No. 16/504,468.
Oct. 19, 2020 Notice of Allowance Issued in U.S. Appl. No. 16/504,468.

*Primary Examiner* — Mahmoud Gimie
(74) *Attorney, Agent, or Firm* — Oliff PLC

(57) ABSTRACT

A controller executes a fuel introduction process when stopping combustion in a cylinder under a situation in which a crankshaft is rotating. The fuel introduction process causes a fuel injection valve to inject fuel and causes the fuel to flow out unburned from inside the cylinder to an exhaust passage. The opening degree of an exhaust gas recirculation valve at a point in time when a state in which the execution condition of the fuel introduction process is not satisfied is switched to a state in which the execution condition of the fuel introduction process is satisfied is a preliminary opening degree. During the execution of the fuel introduction process, the (Continued)

recirculation valve controlling section causes the opening degree of the exhaust gas recirculation valve to be smaller than the preliminary opening degree.

10 Claims, 4 Drawing Sheets

(51) Int. Cl.
*F01N 3/035* (2006.01)
*F01N 3/20* (2006.01)
*F01N 3/025* (2006.01)

(58) Field of Classification Search
USPC .......................................................... 701/108
See application file for complete search history.

(56) References Cited

U.S. PATENT DOCUMENTS

| | | |
|---|---|---|
| 2016/0319718 A1 | 11/2016 | Dudar |
| 2017/0204761 A1 | 7/2017 | Ulrey et al. |
| 2018/0017002 A1 | 1/2018 | Kanno et al. |
| 2018/0119652 A1 | 5/2018 | Dixon et al. |
| 2019/0292959 A1 | 9/2019 | Dudar |

FOREIGN PATENT DOCUMENTS

| | | | |
|---|---|---|---|
| JP | 2007285211 A | * | 11/2007 |
| JP | 2013-136987 A | | 7/2013 |
| JP | 2015-222028 A | | 12/2015 |

* cited by examiner

CONTROLLER AND CONTROL METHOD FOR INTERNAL COMBUSTION ENGINE

This is a continuation of U.S. patent application Ser. No. 16/504,468 filed Jul. 8, 2019 (now U.S. Pat. No. 10,890,143), which claims priority from Japanese Application No. 2018-148059 filed in Japan on Aug. 7, 2018. The disclosure of each of the prior applications is incorporated herein by reference in its entirety.

BACKGROUND

1. Field

The present disclosure relates to a controller and control method for an internal combustion engine.

2. Description of Related Art

US Patent Application Publication No. 2014/0041362 discloses an internal combustion engine fueled by gasoline. The internal combustion engine includes a three-way catalyst for purifying exhaust gas in the exhaust passage. A particulate filter for trapping particulate matter (PM) is arranged in a section of the exhaust passage at the downstream side of the three-way catalyst.

In some cases, the internal combustion engine disclosed in the document stops combustion in the cylinder when the load on the internal combustion engine is low in a case in which the required torque of the internal combustion engine is reduced, for example, due to cancellation of accelerator operation. In the combustion stop period, a fuel introduction process for regenerating the particulate filter is executed. That is, the fuel introduction process causes the fuel injection valve to inject fuel and causes the fuel to flow out unburned from inside the cylinder to the exhaust passage. When introduced into the three-way catalyst, the fuel is burned to increase the temperature of the three-way catalyst. Then, high temperature gas flows into the particulate filter, increasing the temperature of the particulate filter. This burns particulate matter trapped by the particulate filter.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Examples of the present disclosure will now be described.

Example 1: A controller for an internal combustion engine is provided. The internal combustion engine includes a three-way catalyst that is arranged in an exhaust passage and purifies exhaust gas, a particulate filter that is arranged in a section of the exhaust passage at a downstream side of the three-way catalyst to trap particulate matter contained in the exhaust gas, an exhaust gas recirculation passage that extends from a section of the exhaust passage at an upstream side of the particulate filter and communicates with an intake passage to recirculate the exhaust gas to the intake passage, and an exhaust gas recirculation valve that opens and closes a flow path of the exhaust gas recirculation passage. The internal combustion engine is configured to burn, in a cylinder, air-fuel mixture containing fuel injected from an fuel injection valve by spark discharge of an ignition device. The controller is configured to execute a fuel introduction process when stopping combustion in the cylinder under a situation in which a crankshaft of the internal combustion engine is rotating. The fuel introduction process causes fuel to be injected from the fuel injection valve and causes the fuel to flow out unburned from inside the cylinder to the exhaust passage. The controller includes a recirculation valve controlling section that controls opening and closing of the exhaust gas recirculation valve. An opening degree of the exhaust gas recirculation valve at a point in time when a state in which an execution condition of the fuel introduction process is not satisfied is switched to a state in which the execution condition of the fuel introduction process is satisfied is a preliminary opening degree. The recirculation valve controlling section is configured to cause an opening degree of the exhaust gas recirculation valve to be smaller than the preliminary opening degree during execution of the fuel introduction process.

The above-described configuration limits the opening degree of the exhaust gas recirculation valve during the execution of the fuel introduction process. This restricts returning of the fuel that has been introduced into the exhaust passage and the gas that has been heated in the three-catalyst to the intake passage via the exhaust gas recirculation passage. Therefore, the particulate filter is effectively heated without wasting the fuel that has been introduced into the exhaust passage and the gas that has been heated in the three-catalyst.

Technologies such as that disclosed in the above-mentioned document may employ an exhaust gas recirculation device to recirculate exhaust gas to the intake passage. An exhaust gas recirculation device includes an exhaust gas recirculation passage that connects a section of the exhaust passage at the upstream side of the particulate filter to the intake passage. In an internal combustion engine equipped with an exhaust gas recirculation device, execution of the above-mentioned fuel introduction process causes some the fuel that has flowed out to the exhaust passage and some of the heated gas to flow out to the intake passage. The particulate filter thus may not be effectively heated. The above-described configuration decreases the possibility of such a drawback.

Example 2: The recirculation valve controlling section is configured to set the opening degree of the exhaust gas recirculation valve to 0 during the execution of the fuel introduction process.

With the above-described configuration, the amount of fuel or gas returned to the intake passage via the exhaust gas recirculation passage is almost 0. This allows the particulate filter to be promptly heated to an intended target temperature that corresponds to the fuel injection amount from the fuel injection valve.

Example 3: The recirculation valve controlling section is configured to cause, after the execution condition of the fuel introduction process is satisfied, the opening degree of the exhaust gas recirculation valve to be smaller than the preliminary opening degree in a period from a point in time before fuel is injected from the fuel injection valve to a point in time during the execution of the fuel introduction process.

With the above-described configuration, the opening degree of the exhaust gas recirculation valve is already limited at the point in time when the fuel introduction process is started. This prevents fuel or high-temperature gas from being returned to the intake passage during the period from when the opening degree of the exhaust gas recirculation valve starts being controlled to a small opening degree to when the control of the opening degree of the exhaust gas recirculation valve is completed.

Example 4: A control method for an internal combustion engine is provided that performs the various processes described in Examples 1 to 3.

Example 5: A non-transitory computer readable memory medium is provided that stores a program that causes a processing device to perform the various processes described in Examples 1 to 3.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, with the exception of operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

A controller for an internal combustion engine according to an embodiment of the present disclosure will now be described with reference to FIGS. 1 to 4.

First, the schematic configuration of the hybrid system in a hybrid vehicle will be described.

Figure 1:
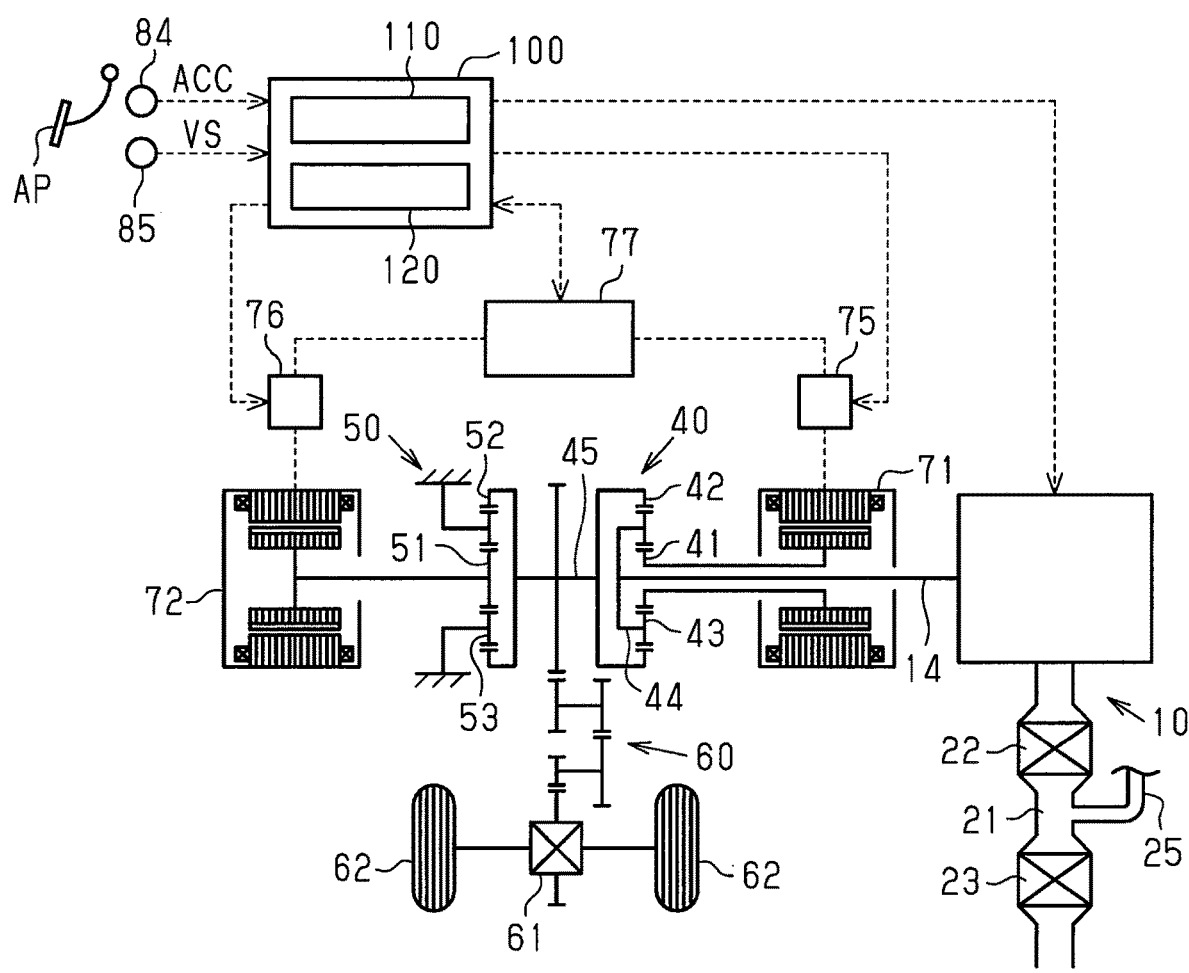
FIG. 1 is a schematic diagram of a hybrid system including a controller for an internal combustion engine according to an embodiment of the present disclosure.

As shown in FIG. 1, the hybrid vehicle includes an internal combustion engine 10, a driving force distribution-integration mechanism 40 connected to a crankshaft 14 of the internal combustion engine 10, and a first motor generator 71 connected to the driving force distribution-integration mechanism 40. The driving force distribution-integration mechanism 40 is coupled to a second motor generator 72 via a reduction gear 50 and to driven wheels 62 via a speed reduction mechanism 60 and a differential 61.

The driving force distribution-integration mechanism 40 is a planetary gear mechanism and includes a sun gear 41, which is an external gear, and a ring gear 42, which is an internal gear coaxially arranged with the sun gear 41. Pinion gears 43 meshing with the sun gear 41 and the ring gear 42 are provided between the sun gear 41 and the ring gear 42. The pinion gears 43 are supported by a carrier 44 to be allowed to rotate and orbit. The sun gear 41 is coupled to the first motor generator 71. The carrier 44 is coupled to the crankshaft 14. The ring gear 42 is connected to a ring gear shaft 45. The ring gear shaft 45 is coupled to both of the reduction gear 50 and the speed reduction mechanism 60.

When the output torque of the internal combustion engine 10 is input to the carrier 44, the output torque is distributed to the sun gear 41 and the ring gear 42. That is, the output torque of the internal combustion engine 10 is input to the first motor generator 71 to cause the first motor generator to generate power.

In contrast, when the first motor generator 71 is caused to perform as an electric motor, the output torque of the first motor generator 71 is input to the sun gear 41. The output torque of the first motor generator 71 input to the sun gear 41 is distributed to the carrier 44 and the ring gear 42. The output torque of the first motor generator 71 is input to the crankshaft 14 via the carrier 44 to rotate the crankshaft 14. This process, in which the crankshaft 14 is rotated by operation of the first motor generator 71, is referred to as "motoring" in the present embodiment.

The reduction gear 50 is a planetary gear mechanism and includes a sun gear 51 and a ring gear 52. The sun gear 51 is an external gear coupled to the second motor generator 72. The ring gear 52 is an internal gear coaxially arranged with the sun gear 51. The ring gear 52 is connected to the ring gear shaft 45. Pinion gears 53 meshing with the sun gear 51 and the ring gear 52 are provided between the sun gear 51 and the ring gear 52. Each pinion gear 53 is rotational but is not allowed to orbit.

By causing the second motor generator 72 to perform as a generator when decelerating the vehicle, regenerative braking force is generated in the vehicle in accordance with the amount of power generated by the second motor generator 72. Also, when the second motor generator 72 is caused to perform as an electric motor, the output torque of the second motor generator 72 is input to the driven wheels 62 via the reduction gear 50, the ring gear shaft 45, the speed reduction mechanism 60, and the differential 61. The driven wheels 62 are thus rotated to drive the vehicle.

The first motor generator 71 exchanges electric power with a battery 77 through a first inverter 75. The second motor generator 72 exchanges electric power with the battery 77 through a second inverter 76.

Figure 2:
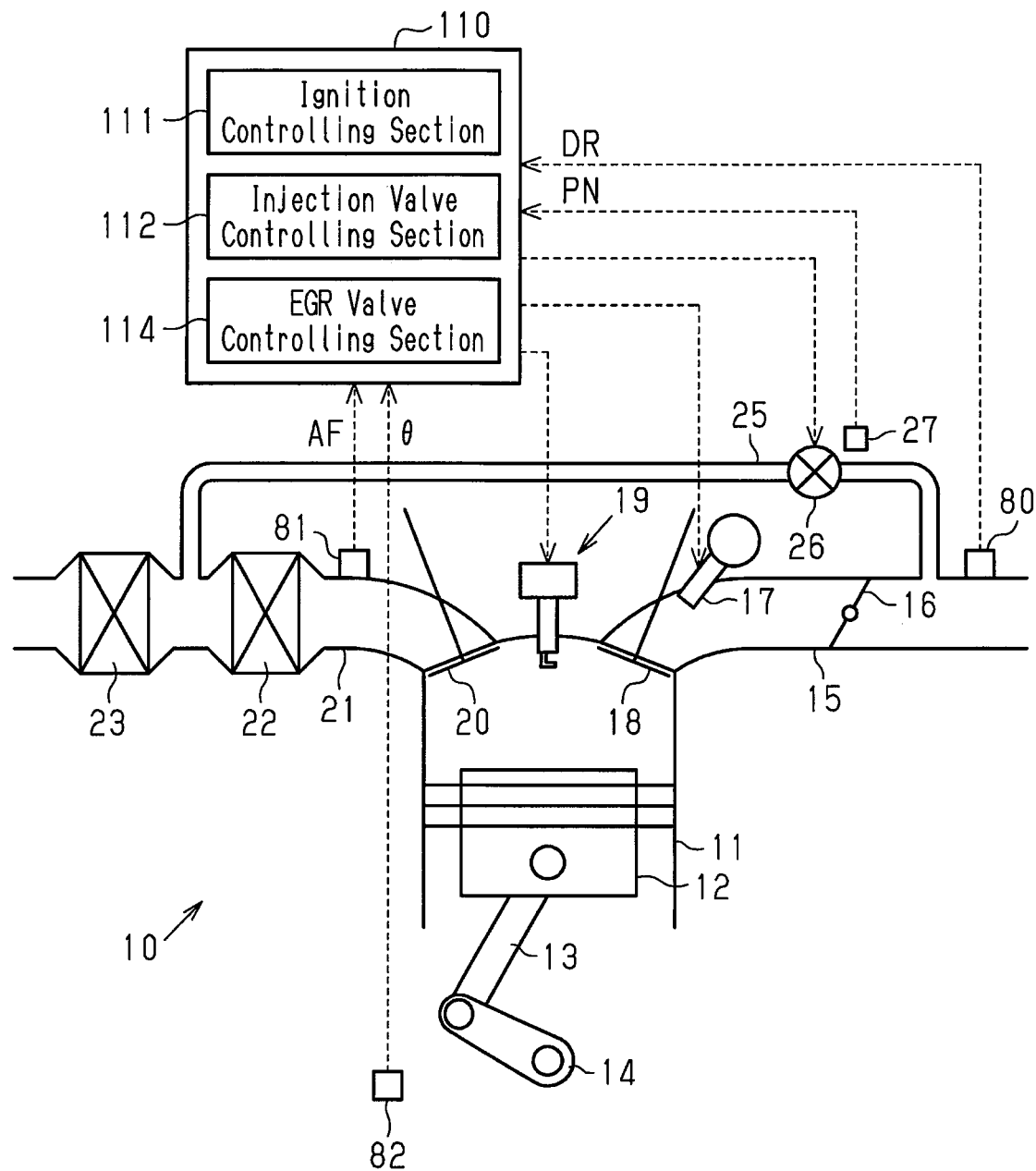
FIG. 2 is a schematic diagram of then internal combustion engine of FIG. 1.

As shown in FIG. 2, a piston 12 is accommodated and reciprocates in a cylinder 11 of the internal combustion engine 10. The piston 12 is coupled to a crankshaft 14 via a connecting rod 13. An air flowmeter 80 for detecting an intake air amount is arranged in an intake passage 15 of the internal combustion engine 10. A throttle valve 16 is arranged in a section of the intake passage 15 at the downstream side of the air flowmeter 80. The throttle valve 16 opens or closes the flow path of the intake passage 15 to regulate the intake air amount to the cylinder 11. The internal combustion engine 10 also includes a fuel injection valve 17, which injects fuel into a section of the intake passage 15 at the downstream side of the throttle valve 16. When an intake valve 18 is open, fuel and air are introduced into the cylinder 11 via the intake passage 15. Then, in the cylinder 11, mixture of the air introduced through the intake passage 15 and the fuel injected from the fuel injection valve 17 is burned by spark discharge of an ignition device 19. Exhaust gas generated by burning the air-fuel mixture in the cylinder 11 is discharged to an exhaust passage 21 when an exhaust valve 20 is opened. The exhaust passage 21 is provided with a three-way catalyst 22, which purifies exhaust gas, and a particulate filter 23, which is arranged at the downstream side of the three-way catalyst 22. The particulate filter 23 has a function of collecting particulate matter contained in the exhaust gas flowing through the exhaust passage 21. An air-fuel ratio sensor 81 is arranged at the upstream side of the three-way catalyst 22 in the exhaust passage 21 to detect the oxygen concentration of the gas flowing through the exhaust passage 21, that is, the air-fuel ratio of the air-fuel mixture.

An exhaust gas recirculation passage 25 extends from a section of the exhaust passage 21 between the three-way catalyst 22 and the particulate filter 23. The exhaust gas recirculation passage 25 recirculates exhaust gas to the intake passage 15. The exhaust gas recirculation passage 25 is connected to a section of the intake passage 15 at the upstream side of the throttle valve 16. An exhaust gas recirculation (EGR) valve 26 is provided in the middle of the exhaust gas recirculation passage 25. The exhaust gas recirculation valve 26 opens and closes the flow path of the exhaust gas recirculation passage 25. The flow rate of the gas returned from the exhaust passage 21 to the intake passage 15 is regulated by adjusting the opening degree of the exhaust gas recirculation valve 26. Although not illustrated, the exhaust gas recirculation valve 26 has an actuator that actuates the valve element. A valve opening degree sensor 27, which detects the opening degree of the exhaust gas recirculation valve 26, is arranged in the vicinity of the exhaust gas recirculation valve 26.

In the internal combustion engine 10, combustion of air-fuel mixture in the cylinder 11 may be stopped while the crankshaft 14 is rotating. The period during which combustion of air-fuel mixture in the cylinder 11 is stopped while the crankshaft 14 is rotating will be referred to as a combustion stop period. In the combustion stop period, the piston 12 reciprocates in synchronization with rotation of the crankshaft 14. Thus, the air introduced into the cylinder 11 via the intake passage 15 flows out to the exhaust passage 21 without being used for combustion.

In the combustion stop period, either a fuel cutoff process or a fuel introduction process is selected and executed. The fuel cutoff process stops fuel injection of the fuel injection valve 17. The fuel introduction process causes the fuel injection valve 17 to inject fuel and causes the fuel to flow out unburned from inside the cylinder 11 to the exhaust passage 21. When the fuel introduction process is executed, the fuel injected from the fuel injection valve 17 flows through the exhaust passage 21 together with air. The fuel is introduced into the three-way catalyst 22. At this time, if the temperature of the three-way catalyst 22 is higher than or equal to the activation temperature and a sufficient amount of oxygen is present in the three-way catalyst 22 to burn the fuel, the fuel is burned in the three-way catalyst 22. This increases the temperature of the three-way catalyst 22. Then, high temperature gas flows into the particulate filter 23, increasing the temperature of the particulate filter 23. If the temperature of the particulate filter 23 becomes higher than or equal to the temperature at which the particulate matter can be burned when oxygen is supplied to the particulate filter 23, the particulate matter trapped in the particulate filter 23 is burned.

Next, the control configuration of the hybrid vehicle will be described with reference to FIGS. 1 and 2.

As shown in FIG. 1, the vehicle controller 100 of the hybrid vehicle calculates a required torque TQR, which is the torque to be output to the ring gear shaft 45, based on an accelerator operation amount ACC and a vehicle speed VS. The accelerator operation amount ACC is the operation amount of an accelerator pedal AP by the driver of the vehicle and is detected by an accelerator operation amount sensor 84. The vehicle speed VS is a value corresponding to the traveling speed of the vehicle and is detected by a vehicle speed sensor 85. The vehicle controller 100 controls the internal combustion engine 10 and the motor generators 71 and 72 based on the calculated required torque TQR.

The vehicle controller 100 includes an engine controlling unit (internal combustion engine controlling unit) 110, which controls the internal combustion engine 10, and a motor controlling unit 120, which controls the motor generators 71 and 72. The engine controlling unit 110 is one example of a controller for an internal combustion engine in the present embodiment. When the fuel introduction process is executed during the combustion stop period, the motor controlling unit 120 controls operation of the first motor generator 71 to perform the motoring. That is, the rotation speed of the crankshaft 14 in the combustion stop period can be controlled through the performance of the motoring.

As shown in FIG. 2, the engine controlling unit 110 receives an air-fuel ratio detection value AF, which is an air-fuel ratio detected by the air-fuel ratio sensor 81. The engine controlling unit 110 also receives an air amount detection value DR, which is an intake air amount detected by the air flowmeter 80. Further, the engine controlling unit 110 receives a crank position detection value 0, which is the rotational position of the crankshaft 14 detected by a crank angle sensor 82. The engine controlling unit 110 receives an opening degree detection value PN, which is the opening degree of the exhaust gas recirculation valve 26 detected by the valve opening degree sensor 27. The engine controlling unit 110 also receives detection values from other sensors attached to various sections of the internal combustion engine 10.

As shown in FIG. 2, the engine controlling unit 110 includes, as functional components, an ignition controlling section 111, which controls the ignition device 19, an injection valve controlling section 112, which controls the fuel injection valve 17, and a recirculation valve controlling section 114, which controls opening and closing of the exhaust gas recirculation valve 26.

The ignition controlling section 111 causes the ignition device 19 to perform spark discharge at point in time when the piston reaches the vicinity of the compression top dead center while a spark discharge permission flag is ON. The ignition controlling section 111 does not cause the ignition device 19 to perform spark discharge while the spark discharge permission flag is OFF, that is, during the combustion stop period.

The injection valve controlling section 112 executes a fuel combustion process for burning fuel in the cylinder 11, the above-described fuel cutoff process, and the above-described fuel introduction process. When executing various processes, the injection valve controlling section 112 calculates a required value QPR of the fuel injection amount of the fuel injection valve 17 and controls the operation of the fuel injection valve 17 based on the required value QPR. The injection valve controlling section 112 calculates the required value QPR of the fuel injection amount that corresponds to the operational state of the internal combustion engine 10 in each process.

The injection valve controlling section 112 executes the fuel introduction process under a situation in which a condition for executing the fuel introduction process (hereinafter referred to as the "execution condition of the fuel introduction process") is satisfied. This execution condition is satisfied when the following two conditions are satisfied in addition to a combustion stop condition in the cylinder 11 of the internal combustion engine 10 (condition 1). One of the conditions (condition 2) is that the temperature of the three-way catalyst 22 is determined to be higher than or equal to a specified temperature. The specified temperature is set to the activation temperature of the three-way catalyst 22 or a temperature slightly higher than the activation temperature. The other one of the conditions (condition 3) is that an estimated value of the amount of trapped particulate matter in the particulate filter 23 is greater than or equal to a determination trapped amount. The combustion stop condition in the cylinder 11 of the internal combustion engine 10 is, for example, that the required value of the output torque of the internal combustion engine 10 is less than 0.

The recirculation valve controlling section 114 basically controls the opening degree of the exhaust gas recirculation valve 26 based on the operational state of the internal combustion engine 10. Specifically, the recirculation valve controlling section 114 basically controls a target opening degree EGV of the exhaust gas recirculation valve 26 based on the operational state of the internal combustion engine 10. The recirculation valve controlling section 114 controls the exhaust gas recirculation valve 26 such that the opening degree of the exhaust gas recirculation valve 26 becomes the target opening degree EGV. That is, the recirculation valve controlling section 114 delivers a drive signal to the actuator of the exhaust gas recirculation valve 26. These processes are normal processes through which the recirculation valve controlling section 114 controls the opening degree of the exhaust gas recirculation valve 26 based on the operational state of the internal combustion engine 10.

The recirculation valve controlling section 114 controls the opening degree of the exhaust gas recirculation valve 26 through a limiting process, which is different from the normal processes, in a period from a point in time that is after the execution condition of the fuel introduction process is satisfied and before fuel is injected from the fuel injection valve 17 in the fuel introduction process to when the execution of the fuel introduction process ends. Specifically, the opening degree of the exhaust gas recirculation valve 26 at the point in time when a state in which the execution condition of the fuel introduction process is not satisfied is switched to a state in which the execution condition is satisfied will be referred to as a preliminary opening degree WGV. The recirculation valve controlling section 114 controls the exhaust gas recirculation valve 26 such that the opening degree of the exhaust gas recirculation valve 26 becomes smaller than the preliminary opening degree WGV in the limiting process.

The preliminary opening degree WGV will now be described. When the condition that the required value of the output torque is 0, which is the combustion stop condition in the cylinder 11 of the internal combustion engine 10, is satisfied, and the opening degree of the throttle valve 16 is small, the pumping loss for introducing intake air into the cylinder 11 of the internal combustion engine 10 increases. Therefore, at the point in time when the required value of the output torque of the internal combustion engine 10 is set to 0, the opening degree of the exhaust gas recirculation valve 26 is increased in order to eliminate the pumping loss. The rotation of the crankshaft 14 of the internal combustion engine 10 remains stopped after the combustion stop condition is satisfied and until the execution condition of the fuel introduction process is satisfied. Thus, no pumping loss occurs in the internal combustion engine 10, and there is no need to adjust the opening degree of the exhaust gas recirculation valve 26 to eliminate pumping loss. Under these circumstances, the opening degree of the exhaust gas recirculation valve 26 after the combustion stop condition is satisfied and until the execution condition of the fuel introduction process is satisfied is maintained at the value when the required value of the output torque of the internal combustion engine 10 is 0 or is slightly smaller than that value. Therefore, the preliminary opening degree WGV, which is the opening degree of the exhaust gas recirculation valve 26 when a state in which the execution condition of the fuel introduction process is not satisfied is switched to a state in which the execution condition is satisfied, is at least a positive value.

In the limiting process, the recirculation valve controlling section 114 sets the target opening degree EGV of the exhaust gas recirculation valve 26 to an introduction opening degree EGV1, which is dedicated to the limiting process. In the present embodiment, the introduction opening degree EGV1 is set to 0 in consideration of the fact that the preliminary opening degree WGV is at least a positive value. The recirculation valve controlling section 114 controls the exhaust gas recirculation valve 26 such that the opening degree of the exhaust gas recirculation valve 26 becomes the introduction opening degree EGV1. Therefore, during the period in which the limiting process is executed, that is, during the period from a point in time before fuel is injected in the fuel introduction process to point in time during the execution of the fuel introduction process, the opening degree of the exhaust gas recirculation valve 26 is smaller than the preliminary opening degree WGV. The recirculation valve controlling section 114 executes the limiting process when a valve opening degree limitation flag, which is a flag for permitting execution of the limiting process, is set to ON.

Figure 3:
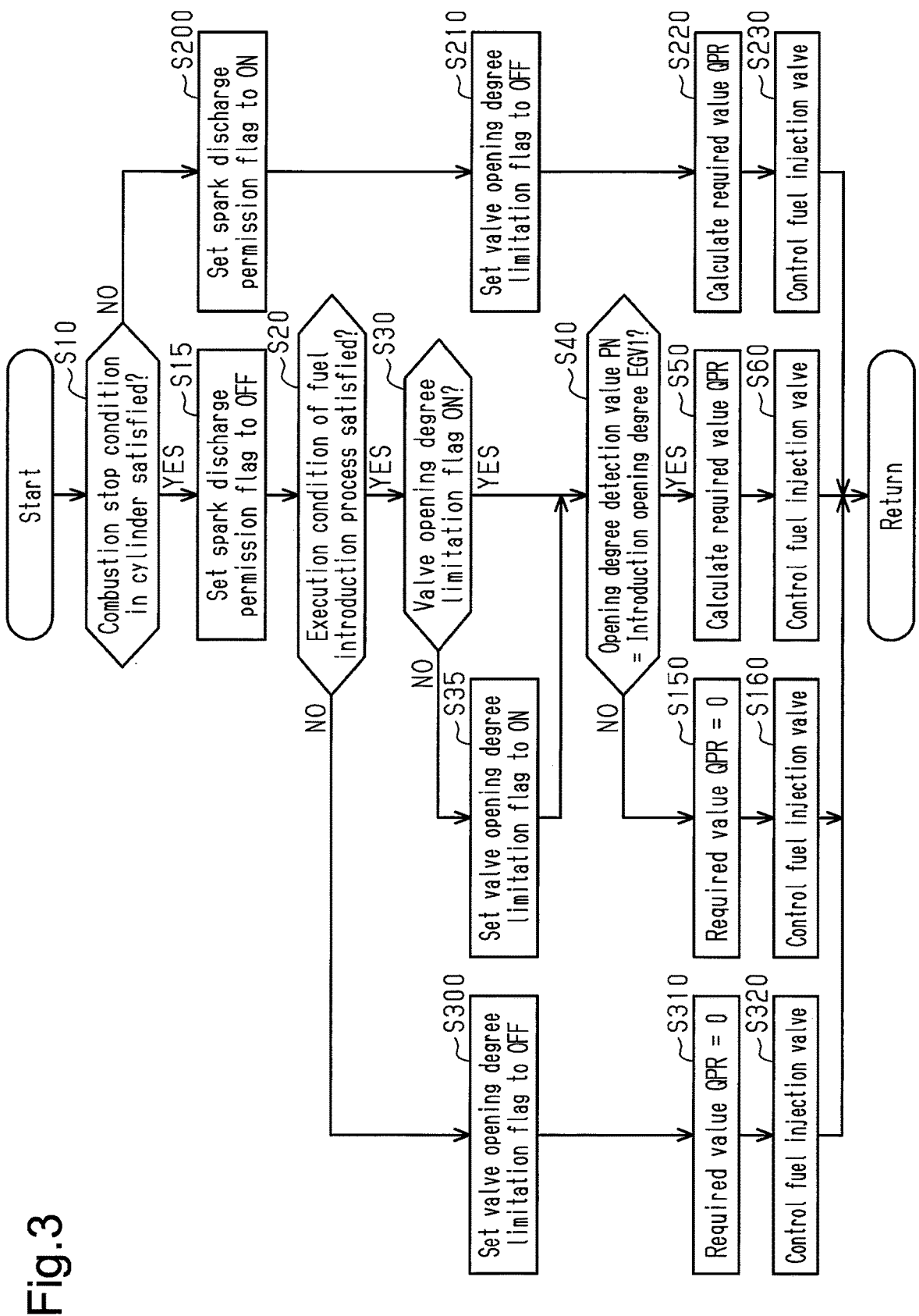
FIG. 3 is a flowchart showing the procedure of an injection valve controlling process in the internal combustion engine of FIG. 1.

Next, the procedure of an injection valve controlling process, through which the injection valve controlling section 112 controls the operation of the fuel injection valve 17, will be described with reference to FIG. 3. The injection valve controlling section 112 executes the following process at every predetermined control cycle (for example, every several milliseconds) while the vehicle controller 100 (engine controlling unit 110) of the hybrid vehicle is operating. At the point in time when the vehicle controller 100 of the hybrid vehicle is activated, the valve opening degree limitation flag is OFF.

The injection valve controlling section 112 executes the process of step S10 when the injection valve controlling process is started. In step S10, the injection valve controlling section 112 determines whether the combustion stop condition of air-fuel mixture in the cylinders 11 is satisfied. As described above, the combustion stop condition of air-fuel mixture in the cylinder 11 is, for example, that the required value of the output torque of the internal combustion engine 10 is less than 0. The injection valve controlling section 112 determines that the combustion stop condition of air-fuel mixture in the cylinder 11 is not satisfied when the required value of the output torque of the internal combustion engine 10 is greater than 0 (step S10: NO). In this case, the injection valve controlling section 112 advances the process to step S200. When the process proceeds to step S200, the motor controlling unit 120 stops the motoring if the motoring is being executed at that point in time.

In step S200, the injection valve controlling section 112 sets the spark discharge permission flag to ON and advances the process to step S210. Then, in step S210, the injection valve controlling section 112 sets the valve opening degree limitation flag to OFF. Thereafter, the injection valve controlling section 112 advances the process to step S220.

In step S220, the injection valve controlling section 112 calculates the required value QPR of the fuel injection amount of the fuel injection valve 17. The injection valve controlling section 112 calculates the required value QPR such that the air-fuel ratio detection value AF becomes a target air-fuel ratio of the intake air amount that corresponds to the required value of the output torque of the internal combustion engine 10. The target air-fuel ratio is set to, for example, the stoichiometric air-fuel ratio or a value near the stoichiometric air-fuel ratio. After the process of step S220, the injection valve controlling section 112 advances the process to step S230.

In step S230, the injection valve controlling section 112 controls the operation of the fuel injection valve 17 based on the calculated required value QPR. Then, the injection valve controlling section 112 temporarily ends the series of processes. The process of step S220 and step S230 is a fuel combustion process in which air-fuel mixture containing fuel injected from the fuel injection valve 17 is burned in the cylinder 11 of the internal combustion engine 10.

If it is determined in step S10 that the required value of the output torque of the internal combustion engine 10 is less than or equal to 0, the injection valve controlling section 112 determines that the combustion stop condition of air-fuel mixture in the cylinder 11 is satisfied (step S10: YES). In this case, the injection valve controlling section 112 advances the process to step S15. In step S15, the injection valve controlling section 112 sets the spark discharge permission flag to OFF and advances the process to step S20. The internal combustion engine 10 is in the combustion stop period while the spark discharge permission flag is OFFf.

In step S20, the injection valve controlling section 112 determines whether the execution condition of the fuel introduction process is satisfied. As described above, one of the conditions (condition 2) for satisfying the execution condition is that the temperature of the three-way catalyst 22 is determined to be higher than or equal to the specified temperature. The temperature of the three-way catalyst 22 can be calculated based on the operating state of the internal combustion engine 10. The other one of the conditions (condition 3) is that an estimated value of the amount of trapped particulate matter in the particulate filter 23 is greater than or equal to a determination trapped amount. When the trapped amount increases, the pressure difference between the section in the exhaust passage 21 between the three-way catalyst 22 and the particulate filter 23 and the section in the exhaust passage 21 that is at the downstream side of the particulate filter 23 is likely to increase. Therefore, the pressure difference can be used to calculate the estimated value of the trapped amount.

When determining that at least one of the above two conditions (condition 2 and condition 3) is not satisfied in step S20 (step S20: NO), the injection valve controlling section 112 advances the process to step S300. When the process proceeds to step S300, the motor controlling unit 120 stops the motoring if the motoring is being executed at that point in time.

In step S300, the injection valve controlling section 112 sets the valve opening degree limitation flag to OFF. Thereafter, the injection valve controlling section 112 advances the process to step S310.

In step S310, the injection valve controlling section 112 sets the required value QPR of the fuel injection amount of the fuel injection valve 17 to 0. In the subsequent step S320, the injection valve controlling section 112 controls the operation of the fuel injection valve 17 based on the required value QPR. That is, fuel is not injected from the fuel injection valve 17 in this case. After executing the process of step S320, the injection valve controlling section 112 temporarily ends the series of processes. The process of step S310 and step S320 is the fuel cutoff process, in which combustion in the cylinder 11 is stopped, and no fuel is introduced into the cylinder 11 under a situation in which the crankshaft 14 of the internal combustion engine 10 is rotating.

When determining that the two conditions (condition 2 and condition 3) for executing the fuel introduction process are both satisfied in step S20 (step S20: YES), the injection valve controlling section 112 advances the process to step S30. As the process proceeds to step S30, the motor controlling unit 120 performs the motoring.

In step S30, the injection valve controlling section 112 determines whether the valve opening degree limitation flag is ON. When determining that the valve opening degree limitation flag is OFF (step S30: NO), the injection valve controlling section 112 advances the process to step S35 and sets the valve opening degree limitation flag to ON, and then advances the process to step S40. In contrast, when determining that the valve opening degree limitation flag is ON in step S30 (step S30: YES), the injection valve controlling section 112 advances the process directly to step S40.

A situation in which the determination in step S30 is NO and a situation in which the determination in step S30 is YES will be described. If the determination in step S20 was NO in the previous cycle of the injection valve controlling process and the determination in step S20 is YES in the current cycle, that is, if a state in which the execution condition of the fuel introduction process is not satisfied is switched to a state in which the execution condition is satisfied, the valve opening degree limitation flag is OFF at that point in time. Therefore, the determination of step S30 is NO in this case. If the determination in step S30 is NO, the process proceeds to step S35 as described above, and the valve opening degree limitation flag is set to ON. Once the valve opening degree limitation flag is set to ON, the determination of step S30 will be YES when the process in the subsequent cycle proceeds to step S30 if, in the subsequent cycle, the combustion stop condition in the cylinder 11 is still satisfied (step S10: YES) and the execution condition of the fuel introduction process is still satisfied (step S20: YES). Thereafter, the determination of step S30 will continuously be YES as long as the state continues in which the combustion stop condition in the cylinder 11 is satisfied and the execution condition of the fuel introduction process is satisfied. When, as time elapses thereafter, the combustion stop condition in the cylinder 11 or the execution condition of the fuel introduction process becomes no longer satisfied, the valve opening degree limitation flag is set to OFF in step S210 or step S300. Therefore, when both the combustion stop condition in the cylinder 11 and the execution condition of the fuel introduction process are both satisfied and the process proceeds to step S30 after the combustion stop condition becomes unsatisfied or the execution condition of the fuel introduction process becomes unsatisfied, the determination of step S30 is NO. In this case, the process proceeds to step S40 via step S35 as described above.

In step S40, the injection valve controlling section 112 determines whether the opening degree of the exhaust gas recirculation valve 26 is the introduction opening degree EGV1. Specifically, the injection valve controlling section 112 compares the opening degree detection value PN detected by the valve opening degree sensor 27 with the introduction opening degree EGV1 set by the recirculation valve controlling section 114. As described above, the introduction opening degree EGV1 is 0 in the present embodiment. The injection valve controlling section 112 determines that the opening degree of the exhaust gas recirculation valve 26 has not reached the introduction opening degree EGV1 (step S40: NO) if the opening degree detection value PN does not match the introduction opening degree EGV1. In this case, the injection valve controlling section 112 advances the process to step S150. In contrast, the injection valve controlling section 112 determines that the opening degree of the exhaust gas recirculation valve 26 has reached the introduction opening degree EGV1 (step S40: YES) if the opening degree detection value PN matches the introduction opening degree EGV1. In this case, the injection valve controlling section 112 advances the process to step S50.

A situation in which the determination in step S40 is NO and a situation in which the determination in step S40 is YES will be described. It takes a certain period of time from when the exhaust gas recirculation valve 26 starts operating in connection with the limiting process executed by the recirculation valve controlling section 114 until the exhaust gas recirculation valve 26 moves to the position corresponding to the introduction opening degree EGV1. Therefore, the determination of step S40 is NO when the exhaust gas recirculation valve 26 is operating and the opening degree of the exhaust gas recirculation valve 26 has no reached the introduction opening degree EGV1 although the limiting process is being executed in association with the valve opening degree limitation flag being set to ON in step S30 or step S35. In contrast, when the opening degree of the exhaust gas recirculation valve 26 reaches the introduction opening degree EGV1 in association with the execution of the limiting process, the determination of step S40 is YES.

If the determination in step S40 is NO and the process proceeds to step S150, the injection valve controlling section 112 sets the required value QPR of the fuel injection amount in the fuel injection valve 17 to 0. In the subsequent step S160, the injection valve controlling section 112 controls the operation of the fuel injection valve 17 based on the required value QPR. Therefore, fuel is not injected from the fuel injection valve 17 when the opening degree of the exhaust gas recirculation valve 26 has not reached the introduction opening degree EGV1. After executing the process of step S160, the injection valve controlling section 112 temporarily ends the series of processes. The process of step S150 and step S160 is the same process as the above-described fuel cutoff process. However, since the motoring is being performed in the process of step S150 and S160, the situation is different from that in which the process of step S310 and S320 is executed (the case in which the motoring is not executed).

If the determination in step S40 is YES and the process proceeds to step S50, the injection valve controlling section 112 calculates the required value QPR of the fuel injection amount for the fuel introduction process. The injection valve controlling section 112 calculates the required value QPR based on the operating state of the internal combustion engine 10. The fuel injection amount for causing fuel to flow out unburned from inside the cylinder 11 to the exhaust passage 21 in the fuel introduction process is smaller than the fuel injection amount when burning air-fuel mixture in the cylinder 11 in the fuel combustion process. Thus, the required value QPR calculated in step S50 is less than the required value QPR calculated in step S220. After step S50, the injection valve controlling section 112 advances the process to step S60.

In step S60, the injection valve controlling section 112 controls the operation of the fuel injection valve 17 based on the calculated required value QPR. As described above, when the process proceeds to step S50, the opening degree of the exhaust gas recirculation valve 26 has reached the introduction opening degree EGV1. That is, fuel is injected from the fuel injection valve 17 when the opening degree of the exhaust gas recirculation valve 26 has reached the introduction opening degree EGV1. After executing the process of step S60, the injection valve controlling section 112 temporarily ends the series of processes. The process of step S50 and step S60 is the fuel introduction process, in which, when combustion in the cylinder 11 is stopped under a situation in which the crankshaft 14 of the internal combustion engine 10 is rotating, fuel is injected from the fuel injection valve 17 to cause the fuel to flow out unburned from inside the cylinder 11 to the exhaust passage 21.

Figure 4:
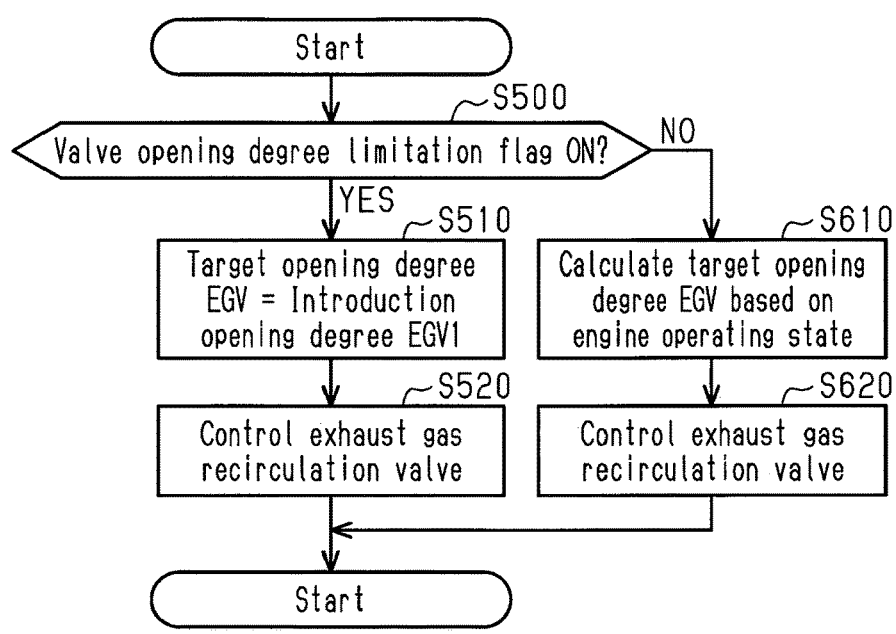
FIG. 4 is a flowchart showing the procedure of a recirculation valve controlling process in the internal combustion engine of FIG. 1.

Next, the procedure of a recirculation valve controlling process, through which the recirculation valve controlling section 114 controls opening and closing of the exhaust gas recirculation valve 26, will be described with reference to FIG. 4. The recirculation valve controlling section 114 executes the following process at every predetermined control cycle (for example, every several milliseconds) while the vehicle controller 100 (engine controlling unit 110) of the hybrid vehicle is operating.

The recirculation valve controlling section 114 executes the process of step S500 when starting the recirculation valve controlling process. In step S500, the recirculation valve controlling section 114 determines whether the valve opening degree limitation flag, which is set by the injection valve controlling section 112, is ON. When determining that the valve opening degree limitation flag is OFF (step S500: NO), the recirculation valve controlling section 114 advances the process to step S610.

In step S610, the recirculation valve controlling section 114 basically controls a target opening degree EGV of the exhaust gas recirculation valve 26 based on the operational state of the internal combustion engine 10. Specifically, the recirculation valve controlling section 114 stores a map that defines the relationship between the engine rotation speed NE, the engine load KL, and the opening degree of the exhaust gas recirculation valve 26. The recirculation valve controlling section 114 refers to this map to calculate, as a target opening degree EGV, the opening degree of the exhaust gas recirculation valve 26 that corresponds to the current engine rotation speed NE, which is calculated based on the crank position detection value 0, and the current engine load KL, which is calculated based on the crank position detection value 0 and the air amount detection value DR. Thereafter, the recirculation valve controlling section 114 advances the process to step S620.

In step S620, the recirculation valve controlling section 114 controls the exhaust gas recirculation valve 26 such that the opening degree of the exhaust gas recirculation valve 26 becomes the target opening degree EGV. After executing the process of step S620, the recirculation valve controlling section 114 temporarily ends the series of processes. The process of step S610 and step S620 is a normal process through which the opening degree of the exhaust gas recirculation valve 26 is controlled based on the operating state of the internal combustion engine 10.

When determining that the valve opening degree limitation flag is ON in step S500 (step S500: YES), the recirculation valve controlling section 114 advances the process to step S510.

In step S510, the recirculation valve controlling section 114 sets the target opening degree EGV of the exhaust gas recirculation valve 26 to 0, which is the introduction opening degree EGV1. Then, in the subsequent step S520, the recirculation valve controlling section 114 controls the exhaust gas recirculation valve 26 such that the opening degree of the exhaust gas recirculation valve 26 becomes the target opening degree EGV. Thereafter, the recirculation valve controlling section 114 temporarily ends the series of processes. The process of step S510 and step S520 is the limiting process for causing the opening degree of the exhaust gas recirculation valve 26 to be smaller than the preliminary opening degree WGV.

The operation and advantages of the present embodiment will now be described.

In the above-described configuration, when the execution condition of the fuel introduction process is satisfied, the recirculation valve controlling section 114 executes the limiting process, so that the opening degree of the exhaust gas recirculation valve 26 is limited. Specifically, when the execution condition of the fuel introduction process is satisfied, the process of step S510 and step S520 in the recirculation valve controlling process is repeated to control the exhaust gas recirculation valve 26 such that the opening degree of the exhaust gas recirculation valve 26 becomes 0. After the opening degree of the exhaust gas recirculation valve 26 reaches 0, the fuel introduction process is started. The opening degree of the exhaust gas recirculation valve 26 is controlled to be 0 over the entire period of time during which the fuel introduction process is executed, that is, over the entire period of during which the process of step S50 and S60 in the injection valve controlling process is repeated. Then, when the fuel introduction process ends, that is, when the period during which the process of step S50 and step S60 in the injection valve controlling process is repeated ends, the control to set the opening degree of the exhaust gas recirculation valve 26 to 0 is cancelled.

It is now assumed that during the execution of the fuel introduction process, the opening degree of the exhaust gas recirculation valve 26 is not limited but remains relatively large. In this case, the gas heated in the three-way catalyst 22 is returned to the intake passage 15 via the exhaust gas recirculation passage 25 in connection with fuel injection in the fuel introduction process. When the gas thus heated is returned to the intake passage 15, the temperature increase of the particulate filter 23 is delayed in accordance with the amount of heat of the gas returned to the intake passage 15.

In this respect, limiting the opening degree of the exhaust gas recirculation valve 26 during the execution of the fuel introduction process as described above prevents the gas heated in the three-way catalyst 22 from being returned to the intake passage 15 through the exhaust gas recirculation passage 25. In particular, in the present embodiment, the opening degree of the exhaust gas recirculation valve 26 is set to 0 during the execution of the fuel introduction process. Therefore, the amount of gas returned to the intake passage 15 via the exhaust gas recirculation passage 25 is substantially 0. Therefore, the gas heated in the three-way catalyst 22 can be delivered to the particulate filter 23 almost without being wasted.

Moreover, in the present embodiment, the opening degree of the exhaust gas recirculation valve 26 is limited over the entire period of the execution of the fuel introduction process. That is, the gas heated in the three-way catalyst 22 reaches the particulate filter 23 almost without being wasted during the period in which the fuel injection for heating the particulate filter 23 continues. As described above, more or less the intended amount of heat is provided to the particulate filter 23 over the intended period for heating the particulate filter 23. The temperature of the particulate filter 23 does not deviate significantly from the intended temperature.

It takes a certain period of time from when the control of the exhaust gas recirculation valve 26 to reduce the opening degree of the exhaust gas recirculation valve 26 is started to when the opening degree of the exhaust gas recirculation valve 26 reaches 0, which is the target opening degree EGV. Therefore, in a case in which the limiting process is started at the point in time of starting the fuel introduction process, that is, in a case in which the determination of step S500 in the recirculation valve controlling process is switched from NO to YES at the point of time of starting the fuel introduction process and the process of step S510 and step S520 is repeated thereafter, fuel may be introduced into the three-way catalyst 22 and a temperature increase may occur in the three-way catalyst 22, and the heated gas may be returned to the intake passage 15 via the exhaust gas recirculation passage 25 even during the period from the start of the limiting process to when the opening degree of the exhaust gas recirculation valve 26 reaches 0. In this respect, in the above-described configuration, the opening degree of the exhaust gas recirculation valve 26 has already become 0 by that point in when the fuel introduction process is started. Therefore, the high temperature gas for heating the particulate filter 23 will not be returned to the intake passage 15 while the exhaust gas recirculation valve 26 is operating.

The present embodiment may be modified as follows. The above-described embodiment and the following modifications can be combined as long as the combined modifications remain technically consistent with each other.

The introduction opening degree EGV1, which is defined as the target opening degree EGV of the exhaust gas recirculation valve 26 in the limiting process, is not necessarily required to be 0 as long as it is less than the preliminary opening degree WGV, which is the opening degree of the exhaust gas recirculation valve 26 at the point in time when the execution condition of the fuel introduction process becomes satisfied. Even if the opening degree of the exhaust gas recirculation valve 26 is not 0, the gas heated in the three-way catalyst 22 is somewhat prevented from being returned to the intake passage 15 through the exhaust gas recirculation passage 25 as long as the opening degree of the exhaust gas recirculation valve 26 is limited to a small value.

An example of a process executed by the recirculation valve controlling section 114 in a case in which the introduction opening degree EGV1 is set to a value other than 0 will be described. In this case, each time a state in which the execution condition of the fuel introduction process is not satisfied is switched to a state in which the execution condition is satisfied, the recirculation valve controlling section 114 stores the opening degree of the exhaust gas recirculation valve 26 at the point in time when the state is switched to the state in which the execution condition is satisfied. Specifically, in a case in which the determination of step S20 in the previous cycle of the injection valve controlling process performed by the injection valve controlling section 112 is NO and the determination of step S20 in the current cycle is YES, the recirculation valve controlling section 114 stores, at that point in time, the opening degree detection value PN detected by the valve opening degree sensor 27 as the preliminary opening degree WGV. Each time a state in which the execution condition of the fuel introduction process is not satisfied is switched to a state in which the execution condition is satisfied, the recirculation valve controlling section 114 overwrites the previous preliminary opening degree WGV with the current preliminary opening degree WGV. Therefore, the preliminary opening degree WGV stored in the recirculation valve controlling section 114 is always the latest preliminary opening degree WGV.

Figure 5:
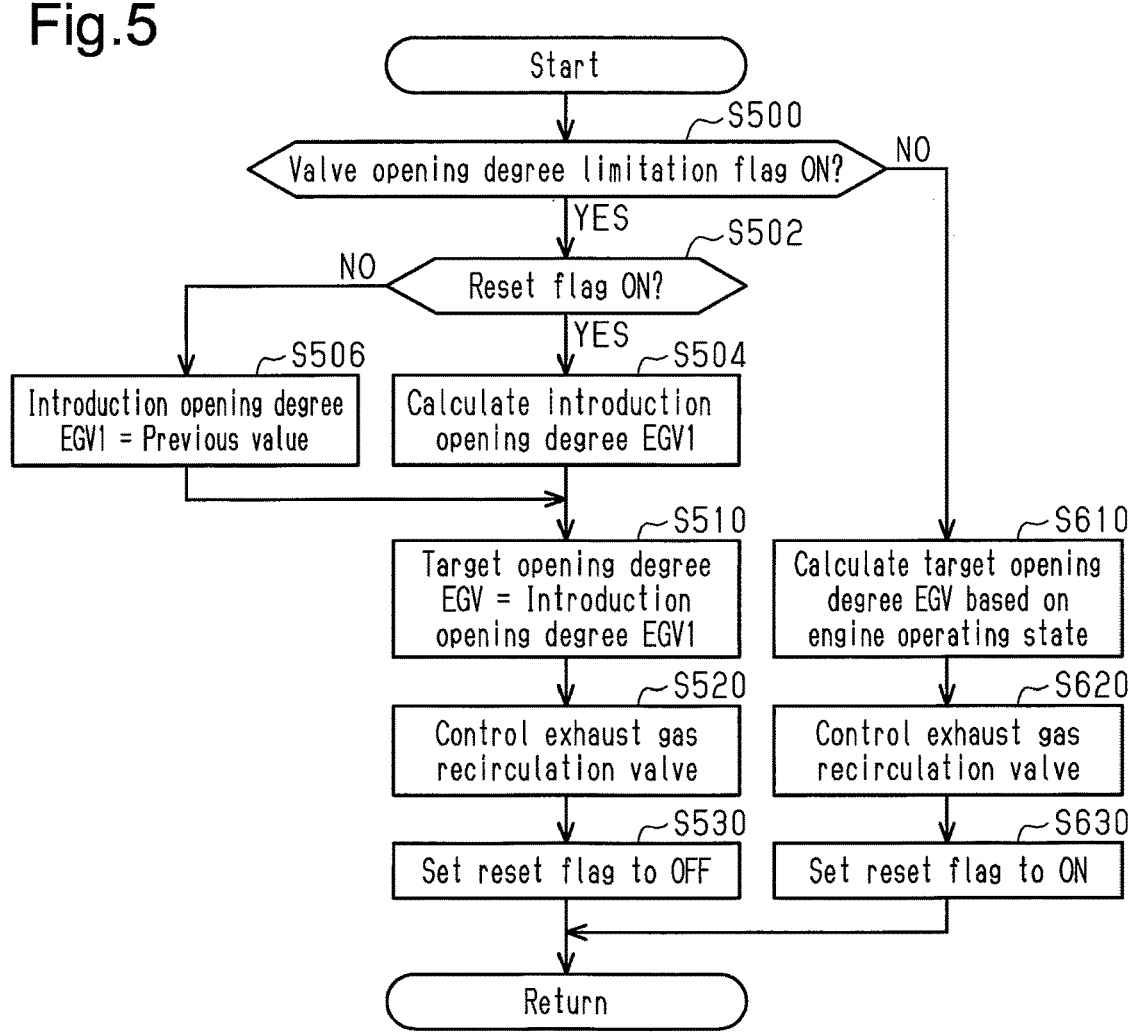
FIG. 5 is a flowchart showing a modification to the recirculation valve controlling process.

Then, in addition to repeating the above-described process, the recirculation valve controlling section 114 repeatedly executes a recirculation valve controlling process (see FIG. 5), which will be discussed below, instead of the recirculation valve controlling process of the above-described the above embodiment (see FIG. 4). The recirculation valve controlling process of FIG. 5 is constructed by adding the processes of step S502, step S504, step S506, step S530, and step S630 to the recirculation valve controlling process shown in FIG. 4 of the above described embodiment. In this recirculation valve controlling process, a reset flag, which is a flag for requesting calculation of the introduction opening degree EGV1, is used. At the point in time when the vehicle controller 100 for a hybrid vehicle is activated, the reset flag is ON.

As shown in FIG. 5, in this recirculation valve controlling process, when determining that the valve opening degree limitation flag is OFF in step S500 (step S500: NO), the recirculation valve controlling section 114 controls the opening degree of the exhaust gas recirculation valve 26 based on the operating state of the internal combustion engine 10 in step S610 and step S620. Then, the recirculation valve controlling section 114 advances the process to step S630. In step S630, the recirculation valve controlling section 114 sets the reset flag to ON. Thereafter, the recirculation valve controlling section 114 temporarily ends the series of processes.

When determining that the valve opening degree limitation flag is ON in step S500 (step S500: YES), the recirculation valve controlling section 114 determines whether the reset flag is ON in step S502. When determining that the reset flag is ON (step S502: YES), the recirculation valve controlling section 114 advances the process to step S504. When determining that the reset flag is OFF (step S502: NO), the recirculation valve controlling section 114 advances the process to step S506.

A situation in which the determination in step S502 is YES and a situation in which the determination in step S502 is NO will be described. A situation in which the determination in step S502 is YES may be, for example, a situation in which the determination in step S500 was NO in the previous cycle of the recirculation valve controlling process, and the determination in step S500 is YES in the current cycle. This is a situation in which the valve opening degree limitation flag is set to ON for the first time after a state in which the execution condition of the fuel introduction process is not satisfied is switched to a state in which the execution condition is satisfied (step S35 in the injection valve controlling process of FIG. 3). If the process proceeds with a valve opening degree limitation flag set to ON (step S500: YES), the reset flag is set to OFF in step S530, which will be discussed below. Once the reset flag is set to OFF, the determination of step S502 will be NO when the process proceeds to step S502 if a state in which the valve opening degree limitation flag is ON (the state in which the execution condition of the fuel introduction process is satisfied) still continues (step S500: YES). Thereafter, the determination of step S502 remains NO as long as the valve opening degree limitation flag continues to be ON.

If the determination in step S502 is YES and the process proceeds to step S504, the recirculation valve controlling section 114 calculates the introduction opening degree EGV1 as a value less than the preliminary opening degree WGV. After step S504, the recirculation valve controlling section 114 advances the process to step S510.

In contrast, if the determination in step S502 is NO and the process proceeds to step S506, the recirculation valve controlling section 114 sets the introduction opening degree EGV1 to the introduction opening degree EGV1 of the previous cycle. After step S506, the recirculation valve controlling section 114 advances the process to step S510.

With the process of step S502, step S504, and step S506, the introduction opening degree EGV1 is provisionally calculated when a state in which the execution condition of the fuel introduction process is not satisfied is switched to a state in which the execution condition is satisfied (step S504). Then, while the execution condition of the fuel introduction process is satisfied, the introduction opening degree EGV1 is maintained at a certain value (step S506).

When the process proceeds to step S510, the recirculation valve controlling section 114 controls the exhaust gas recirculation valve 26 such that the opening degree of the exhaust gas recirculation valve 26 becomes the introduction opening degree EGV1 through step S510 and step S520. Then, in step S530, the recirculation valve controlling section 114 sets the reset flag to OFF and temporarily ends the series of processes. In the recirculation valve controlling process of FIG. 5 described above, the processes of step S502, step S504, step S506, step S510, and step S520 correspond to the limiting process.

Each time a state in which the execution condition of the fuel introduction process is not satisfied is switched to a state in which the execution condition is satisfied, the preliminary opening degree WGV may vary. The above-described recirculation valve controlling process allows the introduction opening degree EGV1 to be changed in step S504 each time such variation of the preliminary opening degree WGV occurs.

In the recirculation valve controlling process of the above-described modification shown in FIG. 5, the introduction opening degree EGV1 is a constant value while the execution condition of the fuel introduction process continues to be satisfied. However, the introduction opening degree EGV1 may be changed while the execution condition of the fuel introduction process continues to be satisfied. In this case, in the flow of the process shown in FIG. 5, step S502, step S530, and step S630, which are processes related to the reset flag, are deleted, and step S506 is deleted. Then, each time the determination whether the valve opening limitation flag is ON in step S500 becomes YES, the introduction opening degree EGV1 is simply recalculated in step S504.

The period in which the opening degree of the exhaust gas recirculation valve 26 is limited may be changed as long as it includes the period during which the fuel introduction process is executed. Specifically, the point in time at which the opening degree of the exhaust gas recirculation valve 26 starts being limited is not limited to that in the above-described embodiment. For example, the opening degree of the exhaust gas recirculation valve 26 may start being decreased at the same time as the fuel introduction process is started. Also, the opening degree of the exhaust gas recirculation valve 26 may start being decreased after the fuel introduction process is started. Furthermore, the point in time at which the limitation on the opening degree of the exhaust gas recirculation valve 26 is ended is not limited to that in the above-described embodiment. For example, the limitation on the opening degree of the exhaust gas recirculation valve 26 may be ended at a point in time in the middle of the execution of the fuel introduction process. If the opening degree of the exhaust gas recirculation valve 26 is limited even for a short period of time during the execution of the fuel introduction process, the gas heated in three-way catalyst 22 is prevented from being returned to the intake passage 15 for that period.

The opening degree of the exhaust gas recirculation valve 26 may be limited from a point in time during the execution of the fuel introduction process to when a predetermined time has elapsed after the end of the fuel introduction process. A temporal delay can occur when the gas heated in the three-way catalyst 22 reaches the inlet of the exhaust gas recirculation passage 25, which is located at the downstream side of the three-way catalyst 22 (the section of the exhaust passage 21 to which the exhaust gas recirculation passage 25 is connected) or the particulate filter 23, and that temporal delay corresponds to the distance between the three-way catalyst 22 and the section at the downstream side of the three-way catalyst 22. Thus, even after the fuel introduction process is ended, the gas heated in the three-way catalyst 22 may flow to a section at the downstream side of the three-way catalyst 22. Therefore, if the opening degree of the exhaust gas recirculation valve 26 is limited even after the fuel introduction process is ended, the high-temperature gas flowing downstream from the three-way catalyst 22 after the end of the fuel introduction process is prevented from being returned to the intake passage 15 via the exhaust gas recirculation passage 25.

When the opening degree of the exhaust gas recirculation valve 26 is limited until a predetermined time has elapsed after the end of the fuel introduction process, the point in time to end the limitation on the opening degree of the exhaust gas recirculation valve 26 simply needs be defined in accordance with an index that indicates that the gas heated in the three-way catalyst 22 has entirely reached the inlet of the exhaust gas recirculation passage 25 after the fuel introduction process is ended. As such an index, an accumulated value of the intake air amount from the point in time when the fuel introduction process is ended (hereinafter referred to as a post-termination accumulated value) may be used. For example, based on the volume of a section of the exhaust passage 21 from the downstream end of the three-way catalyst 22 to the inlet of the exhaust gas recirculation passage 25, the intake air amount required for the gas located in the three-way catalyst 22 to reach the inlet of the exhaust gas recirculation passage 25 is calculated in advance as a specified value. When the post-termination accumulated value reaches the specified value, the limitation on the opening degree of the exhaust gas recirculation valve 26 simply needs to be ended.

In the above-described embodiment, the fuel injection through the fuel introduction process is started (step S50, step S60) immediately after the opening degree of the exhaust gas recirculation valve 26 reaches the introduction opening degree EGV1 (step S40: YES). However, after the opening degree of the exhaust gas recirculation valve 26 reaches the introduction opening degree EGV1, the fuel injection may be started when a certain amount of time has elapsed in a state in which the opening degree of the exhaust gas recirculation valve 26 as the introduction opening degree EGV1 is maintained. For example, through experiments and the like, a specified time is obtained in advance that is considered to be sufficient for the opening degree of the exhaust gas recirculation valve 26 to reach the introduction opening degree EGV1. Then, fuel injection may be started when the specified time has elapsed from the start of the limiting process. In this case, the shorter the period in which the opening degree of the exhaust gas recirculation valve 26 reaches the introduction opening degree EGV1, the longer becomes the period from the point in time when the opening degree of the exhaust gas recirculation valve 26 reaches the introduction opening degree EGV1 until the fuel injection is started.

The types of the exhaust gas recirculation valve 26 include a type that changes the opening degree of the exhaust gas recirculation valve 26 in accordance with the pressure of gas flowing in the exhaust passage 21 when the exhaust gas recirculation valve 26 is not controlled. When this type of the exhaust gas recirculation valve 26 is employed, the exhaust gas recirculation valve 26 does not need to be controlled under a situation in which the combustion stop condition in the cylinder 11 of the internal combustion engine 10 is satisfied, and the valve opening degree limitation flag is OFF. Even under a situation in which the combustion stop condition is satisfied, it is unlikely that there is no gas flowing through the exhaust passage 21 at all. In a case in which employing the above-described type of the exhaust gas recirculation valve 26, if gas flowing through the exhaust passage 21 is present, the opening degree of the exhaust gas recirculation valve 26 is greater than 0 due to the pressure of the gas flowing through the exhaust passage 21. Therefore, the preliminary opening degree WGV is at least a positive value. When the exhaust gas recirculation valve 26 is not controlled, the opening degree of the exhaust gas recirculation valve 26 changes in accordance with the pressure of gas as described above. Thus, the preliminary opening degree WGV is unlikely to be fixed to a constant opening degree. Even in this case, if the recirculation valve controlling process described in FIG. 5 is used, the introduction opening degree EGV1 can be changed in step S504 in accordance with change in the preliminary opening degree WGV.

Under a situation in which the combustion stop condition in the cylinder 11 of the internal combustion engine 10 is satisfied and the valve opening degree control flag is OFF, the exhaust gas recirculation valve 26 may be controlled such that the opening degree of the exhaust gas recirculation valve 26 becomes a predetermined opening degree greater than 0. Even in this configuration, the preliminary opening degree WGV is a positive value.

The position of the inlet of the exhaust gas recirculation passage 25 may be located in a section of the exhaust passage 21 at the upstream side of the three-way catalyst 22. In a case in which this configuration is employed, if the opening degree of the exhaust gas recirculation valve 26 is limited in a period that includes the execution of the fuel introduction process, the fuel injected from the fuel injection valve 17 is prevented from being returned to the intake passage 15 via the exhaust gas recirculation passage 25 before reaching the three-way catalyst 22.

In the above-described embodiment, the ignition device 19 does not perform spark discharge during the execution of the fuel introduction process. However, during the execution of the fuel introduction process, spark discharge of the ignition device 19 may be performed in a period in which air-fuel mixture is not burned in the cylinder 11. For example, if spark discharge is performed when the piston 12 is located near the bottom dead center, air-fuel mixture is not burned in the cylinder 11 in which spark discharge has been performed. Therefore, even if spark discharge is performed during the execution of the fuel introduction process, the fuel injected from the fuel injection valve 17 can flow out unburned to the exhaust passage 21 from inside the cylinders 11.

The internal combustion engine for which the controller for an internal combustion engine is employed may be an engine that includes a direct injection valve, which injects fuel directly into the cylinder 11. In this case, during the execution of the fuel introduction process, fuel may be injected from the direct injection valve into the cylinder 11 and flow out unburned to the exhaust passage 21. Unburned fuel is thus introduced into the three-way catalyst 22.

The system of the hybrid vehicle may be a system different from the system shown in FIG. 1 as long as the rotation speed of the crankshaft 14 is controlled through operation of a motor.

The controller for an internal combustion engine according the present disclosure may be used for an internal combustion engine mounted on a vehicle that does not have a power source other than the internal combustion engine. Even in the internal combustion engine installed in such a vehicle, combustion of air-fuel mixture in the cylinder may be stopped under a situation in which the crankshaft 14 is rotating by inertia. If the execution condition of the fuel introduction process is satisfied during the combustion stop period, the fuel introduction process will be executed.

The controller (engine controlling unit) can be constructed by a device that includes a CPU and a ROM and executes software processing, but is not limited to this configuration. For example, at least part of the processes executed by the software in the above-illustrated embodiment may be executed by hardware circuits dedicated to executing these processes (such as ASIC). That is, the controller may be modified as long as it has any one of the following configurations (a) to (c). (a) A configuration including a processor that executes all of the above-described processes according to programs and a program storage device such as a ROM (including a non-transitory computer readable medium) that stores the programs. (b) A configuration including a processor and a program storage device that execute part of the above-described processes according to the programs and a dedicated hardware circuit that executes the remaining processes. (c) A configuration including a dedicated hardware circuit that executes all of the above-described processes. Software processing circuits each including a processor and a program storage device and dedicated hardware circuits may be provided. That is, the above processes may be executed in any manner as long as the processes are executed by processing circuitry that includes at least one of a set of one or more software processing circuits and a set of one or more dedicated hardware circuits.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

What is claimed is:

1. A controller for an internal combustion engine of a hybrid vehicle that includes
    a motor that is coupled to a crankshaft of the internal combustion engine,
    a three-way catalyst that is arranged in an exhaust passage and purifies exhaust gas,
    a particulate filter that is arranged in a section of the exhaust passage at a downstream side of the three-way catalyst to trap particulate matter contained in the exhaust gas,
    an exhaust gas recirculation passage that extends from a section of the exhaust passage at an upstream side of the particulate filter and communicates with an intake passage to recirculate the exhaust gas to the intake passage, and
    an exhaust gas recirculation valve that opens and closes a flow path of the exhaust gas recirculation passage,
    the internal combustion engine being configured to burn, in a cylinder, an air-fuel mixture containing fuel injected from a fuel injection valve by spark discharge of an ignition device,
    wherein the controller is configured to execute a fuel introduction process while combustion in the cylinder is stopped under a situation in which the controller controls the motor of the hybrid vehicle to rotate the crankshaft of the internal combustion engine,
    the fuel introduction process causes fuel to be injected from the fuel injection valve and causes the fuel to flow out unburned from inside the cylinder to the exhaust passage,
    the controller includes a recirculation valve controlling section that controls opening and closing of the exhaust gas recirculation valve,
    an opening degree of the exhaust gas recirculation valve is a preliminary opening degree at a point in time when switching from a state in which an execution condition of the fuel introduction process is not satisfied to a state in which the execution condition of the fuel introduction process is satisfied, and
    the recirculation valve controlling section is configured to cause the opening degree of the exhaust gas recirculation valve to be smaller than the preliminary opening degree during execution of the fuel introduction process so that the flow rate of the air-fuel mixture supplied to the particulate filter after switching the opening degree of the exhaust gas recirculation valve is larger than the flow rate of the air-fuel mixture supplied to the particulate filter before switching the opening degree of the exhaust gas recirculation valve.

2. The controller according to claim 1, wherein the recirculation valve controlling section is configured to cause, after the execution condition of the fuel introduction process is satisfied, the opening degree of the exhaust gas recirculation valve to be smaller than the preliminary opening degree in a period from a point in time before the fuel is injected from the fuel injection valve to a point in time during the execution of the fuel introduction process.

3. The controller according to claim 1, wherein the recirculation valve controlling section is configured to set the opening degree of the exhaust gas recirculation valve to an introduction opening degree that is a constant value during the execution of the fuel introduction process.

4. The controller according to claim 3, wherein the constant value of the introduction opening degree is 0.

5. A control method for an internal combustion engine of a hybrid vehicle that includes
- a motor that is coupled to a crankshaft of the internal combustion engine,
- a three-way catalyst that is arranged in an exhaust passage and purifies exhaust gas,
- a particulate filter that is arranged in a section of the exhaust passage at a downstream side of the three-way catalyst to trap particulate matter contained in the exhaust gas,
- an exhaust gas recirculation passage that extends from a section of the exhaust passage at an upstream side of the particulate filter and communicates with an intake passage to recirculate the exhaust gas to the intake passage, and
- an exhaust gas recirculation valve that opens and closes a flow path of the exhaust gas recirculation passage,
- the internal combustion engine being configured to burn, in a cylinder, an air-fuel mixture containing fuel injected from a fuel injection valve by spark discharge of an ignition device, wherein the control method comprises:
- performing a fuel introduction process, in which, while combustion in the cylinder is stopped under a situation in which the motor of the hybrid vehicle is controlled to rotate the crankshaft of the internal combustion engine, fuel is injected from the fuel injection valve and the fuel is caused to flow out unburned from inside the cylinder to the exhaust passage,
- controlling opening and closing of the exhaust gas recirculation valve, wherein an opening degree of the exhaust gas recirculation valve is a preliminary opening degree at a point in time when switching from a state in which an execution condition of the fuel introduction process is not satisfied to a state in which the execution condition of the fuel introduction process is satisfied, and
- causing the opening degree of the exhaust gas recirculation valve to be smaller than the preliminary opening degree during execution of the fuel introduction process so that the flow rate of the air-fuel mixture supplied to the particulate filter after switching the opening degree of the exhaust gas recirculation valve is larger than the flow rate of the air-fuel mixture supplied to the particulate filter before switching the opening degree of the exhaust gas recirculation valve.

6. The control method according to claim 5, wherein the opening degree of the exhaust gas recirculation valve is set to an introduction opening degree that is a constant value during the execution of the fuel introduction process.

7. The control method according to claim 6, wherein the constant value of the introduction opening degree is 0.

8. A non-transitory computer readable memory medium storing a program that causes a processor to execute a controlling process of an internal combustion engine of a hybrid vehicle that includes
- a motor that is coupled to a crankshaft of the internal combustion engine,
- a three-way catalyst that is arranged in an exhaust passage and purifies exhaust gas,
- a particulate filter that is arranged in a section of the exhaust passage at a downstream side of the three-way catalyst to trap particulate matter contained in the exhaust gas,
- an exhaust gas recirculation passage that extends from a section of the exhaust passage at an upstream side of the particulate filter and communicates with an intake passage to recirculate the exhaust gas to the intake passage, and
- an exhaust gas recirculation valve that opens and closes a flow path of the exhaust gas recirculation passage,
- the internal combustion engine being configured to burn, in a cylinder, an air-fuel mixture containing fuel injected from a fuel injection valve by spark discharge of an ignition device, wherein the controlling process includes
- performing a fuel introduction process, in which, while combustion in the cylinder is stopped under a situation in which the motor of the hybrid vehicle is controlled to rotate the crankshaft of the internal combustion engine, fuel is injected from the fuel injection valve and the fuel is caused to flow out unburned from inside the cylinder to the exhaust passage,
- controlling opening and closing of the exhaust gas recirculation valve, wherein an opening degree of the exhaust gas recirculation valve is a preliminary opening degree at a point in time when switching from a state in which an execution condition of the fuel introduction process is not satisfied to a state in which the execution condition of the fuel introduction process is satisfied, and
- causing the opening degree of the exhaust gas recirculation valve to be smaller than the preliminary opening degree during execution of the fuel introduction process so that the flow rate of the air-fuel mixture supplied to the particulate filter after switching the opening degree of the exhaust gas recirculation valve is larger than the flow rate of the air-fuel mixture supplied to the particulate filter before switching the opening degree of the exhaust gas recirculation valve.

9. The non-transitory computer readable memory medium according to claim 8, wherein the program causes the processor to set the opening degree of the exhaust gas recirculation valve to an introduction opening degree that is a constant value during the execution of the fuel introduction process.

10. The non-transitory computer readable memory medium according to claim 9, wherein the constant value of the introduction opening degree is 0.

* * * * *